(12) United States Patent
Kim et al.

(10) Patent No.: US 7,935,744 B2
(45) Date of Patent: May 3, 2011

(54) ARTIFICIAL MARBLE HAVING QUARTZ EFFECT USING TRANSPARENT CHIP AND PROCESS FOR PREPARING THE SAME

(75) Inventors: Hang-Young Kim, Daejeon (KR); Won-Gu Choi, Cheongju-si (KR)

(73) Assignee: LG Chem, Ltd. (KR)

( * ) Notice: Subject to any disclaimer, the term of this patent is extended or adjusted under 35 U.S.C. 154(b) by 1311 days.

(21) Appl. No.: 11/476,178

(22) Filed: Jun. 27, 2006

(65) Prior Publication Data

US 2007/0004824 A1 Jan. 4, 2007

(30) Foreign Application Priority Data

Jun. 29, 2005 (KR) .................. 10-2005-0056665

(51) Int. Cl.
*B29C 41/22* (2006.01)
*B29C 69/00* (2006.01)
*B32B 17/10* (2006.01)
*B60C 1/00* (2006.01)
*C08J 3/00* (2006.01)
*C08K 3/34* (2006.01)
*C08L 31/00* (2006.01)
*C08L 33/00* (2006.01)
*C09D 5/02* (2006.01)
*C09D 5/29* (2006.01)

(52) U.S. Cl. .......... 523/171; 264/73; 428/441; 428/442; 524/492; 524/493; 524/556

(58) Field of Classification Search .................. 524/492, 524/493, 556; 523/171; 428/441, 442; 264/73
See application file for complete search history.

(56) References Cited

U.S. PATENT DOCUMENTS

| | | | | |
|---|---|---|---|---|
| 3,278,662 | A * | 10/1966 | Mangrum | 264/77 |
| 5,244,941 | A * | 9/1993 | Bruckbauer et al. | 523/171 |
| 6,028,127 | A * | 2/2000 | Yanagase et al. | 523/171 |
| 7,638,189 | B2 * | 12/2009 | Choi | 428/327 |

FOREIGN PATENT DOCUMENTS

KR 10-2004-0059913 7/2004

* cited by examiner

*Primary Examiner* — Patrick D Niland
(74) *Attorney, Agent, or Firm* — Cantor Colburn LLP

(57) ABSTRACT

An artificial marble using transparent chips, and a process for preparing the same, in which transparent chips are prepared by crushing a flat plate made of a composite for the artificial marble, which does not contain an inorganic filler and thus maintains transparency, quartz chips are prepared by crushing a flat plate made of a mixture of the transparent chips and a composite for the artificial marble, which contains an inorganic filler, for uniforming the specific gravity of the quartz chips, and the artificial marble is prepared by applying the quartz chips to a raw material composite for the artificial marble, thereby allowing the artificial marble to have the uniform specific gravity and exhibit a quartz effect.

11 Claims, 1 Drawing Sheet

ARTIFICIAL MARBLE HAVING QUARTZ EFFECT USING TRANSPARENT CHIP AND PROCESS FOR PREPARING THE SAME

This application claims the benefit of the filing date of Korean Patent Application No. 10-2005-0056665 filed on Jun. 29, 2005 in the Korean Intellectual Property Office, the disclosure of which is incorporated herein in its entirety by reference.

TECHNICAL FIELD

The present invention relates to an artificial marble and a process for preparing the same, and more particularly to an artificial marble using transparent chips, and a process for preparing the same, in which transparent chips are prepared by crushing a flat plate made of a composite, which does not contain an inorganic filler and thus maintains transparency, and quartz chips are prepared by crushing a flat plate made of a mixture of the transparent chips and a composite, which contains an inorganic filler for uniforming the specific gravity of the artificial marble, and are applied to a raw material for the artificial marble, thereby allowing the artificial marble to have the uniform specific gravity and exhibit a quartz effect.

BACKGROUND ART

In general, compared to a natural marble, artificial marbles made of acrylic resin have various advantages, such as a fine external appearance, a high processability, a lightweight, and a high strength, thus being widely used as materials for counter tables and other interior products. However, the artificial marbles have a limit to express a similar pattern to that of the natural marble or granite from the general combination of single colored opaque chips.

The artificial marbles made of acrylic resin are manufactured by mixing a filler, such as aluminum hydroxide, calcium carbonate, or silica, other pigments, and a hardening agent to a syrup mixture, which is obtained by mixing a monomer, such as a methylmethacrylate, with polymethyl methacrylate, casting the mixture using a forming die or a continuous steel belt, and hardening the obtained product.

In order to form a pattern and a color of the artificial marble, pigments and chips are used. The chips are generally made of the same material as that of the artificial marble. However, if necessary, the chips are made of a thermoplastic resin, such as polyvinyl chloride (PVC) or polystyrene (PS), or a thermosetting resin, such as epoxy resin or unsaturated polyester. At least one pigment is put into a composite for the artificial marble, and the composite for the artificial marble is manufactured into a flat plate through the same process as that of the conventional artificial marble, and is crushed into chips having various sizes.

Chips, which are used to prepare the conventional artificial marble, contain an inorganic filler, and have excessively low transparency regardless of the material of the chips, thus having a limit to achieve a transparent effect.

In case that chips, which do not contain an inorganic filler, are used, the chips float on the rear surface of the artificial marble (the surface of the artificial marble not contacting the steel belt), due to a difference of specific gravities, and do not harmonize with other chips, and the prepared artificial marble is easily damaged due to a difference of chip distribution between upper and lower portions.

Further, in this case, when the rear surface of the artificial marble, from which transparent chips are exposed, is used as a product surface, the artificial marble has problems, such as generation of pin holes due to air bubbles and problems regarding surface physical properties.

Korean Patent Registration No. 553603 discloses an acrylic artificial marble using chip in chip. This artificial marble also contains an inorganic filler, thus having low transparency.

DISCLOSURE

Technical Problem

Therefore, the present invention has been made in view of the above problems, and it is an object of the present invention to provide an artificial marble, which employs novel chips having a similar specific gravity to that of conventional chips, while maintaining transparency, to prevent the chips from being separated from the conventional chips, uses the surface thereof as a product surface to have stable physical properties, and exhibits the same quartz effect as that of natural marbles, and a method for preparing the same.

Technical Solution

In accordance with an aspect of the present invention, the above and other objects can be accomplished by the provision of an artificial marble comprising quartz chips including transparent chips for exhibiting a quartz effect.

The quartz chips means chips exhibiting a quartz effect. The quartz effect refers to a phenomenon in which transparent chips are dispersed at the surface of an artificial marble and show the inside of the artificial marble, like a natural marble.

The quartz chips of the artificial marble of the present invention include the transparent chips uniformly dispersed in a semitransparent or opaque region serving as a base of the artificial marble. The quartz chips are distinguished from the base of the artificial marble by a color difference and a difference of light transmissivities.

Preferably, the specific gravity of the quartz chips may be equal to that of a raw material composite for the artificial marble, or differ from that of the raw material composite for the artificial marble by ±0.2 or less.

The quartz chips of the artificial marble of the present invention is characterized in that a difference of specific gravities between the quartz chips and the raw material composite for the artificial marble is minimized, i.e., the specific gravity of the artificial marble is uniform.

Preferably, the specific gravity of the quartz chips may be equal to that of the raw material composite for the artificial marble. When a difference of specific gravities between the quartz chips and the raw material composite for the artificial marble is less than the above value, chip separation does not occur.

In order to prepare an artificial marble exhibiting transparency like quartz or high-purity silica containing in a natural marble so as to have a pattern and a color similar to those of the natural marble, the transparent chips are added to the raw material composite for the artificial marble. Here, in order to assure the transparency of the transparent chips, a filler is not added to a base resin, such as an acrylic resin. Accordingly, when the transparent chips are applied to the artificial marble, chip separation occurs due to a difference of specific gravities between the transparent chips and the raw material composite for the artificial marble.

More specifically, a plastic resin has a specific gravity of 1.5 or less, and a transparent acrylic resin, for example, polymethylmethacrylate (PMMA), has a specific gravity of approximately 1.17~1.20. However, the raw material composite for the artificial marble has a specific gravity of approximately 1.4~1.8.

As described above, there is a difference of specific gravities between the transparent resin and the raw material composite for the artificial marble. Accordingly, when the transparent chips are made of the above resin and are applied to the artificial marble, transparent chip separation occurs. Since a transparent polymer having a high specific gravity (more than 1.6) does not currently exist, no artificial marble employing transparent chips exists.

In accordance with the present invention, a difference of specific gravities between the quartz chips and the raw material composite is minimized by uniforming the specific gravities thereof, thereby allowing the transparent chips to exhibit the same effect as natural quartz without the occurrence of chip separation.

The total specific gravity of the quartz chips is preferably 1.4~1.8 similar to that of the raw material composite for the artificial marble, and more preferably 1.5~1.7.

The transparent chips of the artificial marble of the present invention has a light transmissivity of 90~100%, and preferably more than 95%. Conventional chips contain a filler, such as aluminum hydroxide, thus being semi-transparent and having a light transmissivity of less than 60%.

A base resin used in the transparent chips of the artificial marble of the present invention is a transparent polymeric resin, such as acrylic resin (PMMA), polyester resin, and polyethylene terephthalate (PET). Preferably, the transparent chips are transparent acrylic chips using acrylic resin as the base resin.

In accordance with the present invention, the artificial marble, which directly uses the transparent acrylic chips having a high light transmissivity and excellent physical properties by uniforming the specific gravities, exhibits the same effect as natural quartz, and applies post-treatment, such as casting or polishing, which was not applied to the conventional chips due to a difference of specific gravities.

The raw material composite forming the semitransparent or opaque base region of the quartz chips contains a filler for adjusting the specific gravity of the transparent chips, and titanium dioxide, barium sulfate, aluminum hydroxide, calcium carbonate, silica, metal powders, and metal salts are used as an appropriate filler. The specific gravity of the filler is at least 2.5, and preferably in the range of 2.5~10. In order to increase the specific gravity-adjusting effect per amount of the filler used, the filler preferably has a high specific gravity.

The artificial marble of the present invention contains 2~40 parts by weight of the quartz chips per 100 parts by weight of a raw material composite for the artificial marble, which contains 100 parts by weight of a base resin syrup, 50~250 parts by weight of an inorganic filler, 0.1~10 parts by weight of a crosslink agent, and 0.1~10 parts by weight of a polymerization initiator.

The inorganic filler of the raw material composite for the artificial marble is preferably one or a mixture of two or more selected from the group consisting of aluminum hydroxide, magnesium hydroxide, calcium aluminate, calcium carbonate, silica, and alumina, and most preferably aluminum hydroxide. The amount of the inorganic filler used is 50~250 parts by weight, and preferably 100~200 parts by weight. When the amount of the inorganic filler is less than the lower limit, the viscosity of the raw material composite is excessively low and the strength and the surface hardness of a flat plate obtained by hardening the raw material composite are low, and when the amount of the inorganic filler is more than the upper limit, the viscosity of the raw material composite is high to cause a difficulty in handling it, the weight of the flat plate is increased, the impact strength of the flat plate is decreased, and floatation of the quartz chips on the flat plate is increased.

Preferably, the viscosity of the raw material composite for the artificial marble is 30~100 Poise. However, the viscosity of the raw material composite can be adjusted by using the acrylic resin, particularly a low-viscosity monomer, and an additional agent as well as by the amounts of the inorganic matter and the chips used, thus not being limited.

The amount of the quartz chips used may be different according to the sizes of the quartz chips, but is preferably 2~40 parts by weight. When the amount of the quartz chips used is not more than the lower limit, the frequency of occurrence of the quartz chips on the surface of the artificial marble is low, and thus the artificial marble cannot exhibit the quartz effect. On the other hand, when the amount of the quartz chips used is not less than the upper limit, the viscosity of the raw material composite is increased, thereby causing damage to the artificial marble and increasing the generation of air bubbles in the artificial marble.

The base resin of the raw material composite of the artificial marble of the present invention is made of a thermoplastic resin, such as polyvinyl chloride (PVC) or polystyrene (PS), or a thermosetting resin, such as epoxy resin or unsaturated polyester, and preferably made of an acrylic resin.

The quartz chips of the artificial marble of the present invention contain 50~200 parts by weight of the transparent chips per 100 parts by weight of a composite for the artificial marble, which contains 100 parts by weight of a base resin syrup, 300~500 parts by weight of an inorganic filler, 0.1~10 parts by weight of a crosslink agent, 0.1~10 parts by weight of a polymerization initiator, and 0.5~3 parts by weight of a thixotropy agent made of fine silica.

The inorganic filler of the composite for preparing the quartz chips is preferably one or a mixture of two or more selected from the group consisting of aluminum hydroxide, magnesium hydroxide, Talc, and calcium carbonate, and most preferably aluminum hydroxide. Preferably, the amount of the inorganic filler used is 300~500 parts by weight per 100 parts by weight of the base resin syrup. When the amount of the inorganic filler is less than the lower limit, the viscosity of the composite is excessively low and the floatation of the quartz chips on the surface of the artificial marble occurs, and when the amount of the inorganic filler is more than the upper limit, the viscosity of the composite is high to cause a difficulty in handling it, floatation of the transparent chips is severe to cause increase of layer separation in a flat plate obtained by hardening the composite, and the impact strength of the flat plate is decreased.

In order to prevent the floatation and separation of the transparent chips when the quartz chips are prepared, the specific gravity of the quartz chips is preferably 1.4~1.8, and more preferably 1.5~1.7. For this reason, the amount of the inorganic matter used is maximally increased. In this case, layer separation of the transparent chips in the flat plate used for preparing the quartz chips become severe. In order to solve this problem, the thixotropy agent for lowering the fluidity of the transparent chips in the composite is used, and the flat plate has a thickness equal to the maximum diameter of the transparent chips, thereby maximally preventing the layer separation. The diameters of the transparent chips do not exceed 6 mm.

The transparent chips of the artificial marble of the present invention are made of a composite, which contains 100 parts by weight of a base resin syrup, 0.1~10 parts by weight of a crosslink agent, and 0.1~10 parts by weight of a polymerization initiator. The transparent chips may be made of a conventional acrylic plate maintaining transparency.

In accordance with another aspect of the present invention, there is provided a process for preparing an artificial marble comprising preparing transparent chips by forming a flat plate using a composite for the artificial marble, which does not contain an inorganic filler, hardening the flat plate, and crushing the hardened flat plate; preparing quartz chips by forming a flat plate by mixing the transparent chips with a composite for the artificial marble, which contains an inorganic filler, hardening the flat plate, and crushing the hardened flat plate; and mixing the quartz chips with a raw material composite for the artificial marble.

Preferably, the specific gravity of the quartz chips becomes equal to or close to the specific gravity of the raw material composite for the artificial marble by adjusting the specific gravity and the amount of the inorganic filler of the quartz chips. Further, in order to prevent floatation and separation of the transparent chips, the flat plate used in the preparation of the quartz chips has a thickness equal to the maximum diameter of the transparent chips.

DESCRIPTION OF DRAWINGS

The above and other objects, features and other advantages of the present invention will be more clearly understood from the following detailed description taken in conjunction with the accompanying drawings, in which.

BEST MODE

Figure 1:
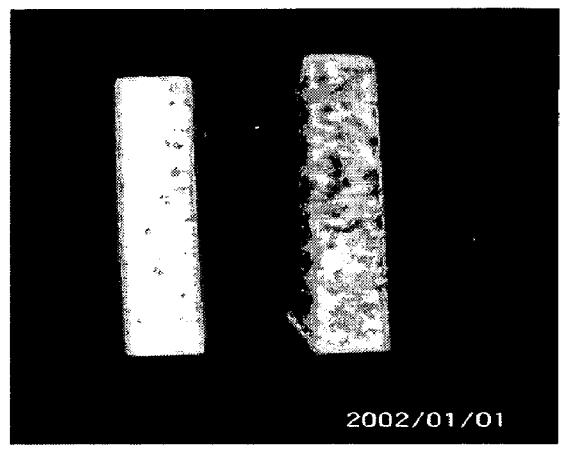
FIG. 1 is a photograph illustrating side surfaces of flat plates for preparing quartz chips using transparent chips in accordance with the present invention.

Now, preferred embodiments of the present invention will be described in detail with reference to the annexed drawings.

Hereinafter, a process for preparing an artificial marble in accordance with the present invention will be described in detail.

The process of the present invention comprises preparing transparent chips, preparing quartz chips, and preparing the artificial marble.

First, a hardened product having a flat plate shape is prepared using a composite for the artificial marble, which does not contain an inorganic filler, and is crushed into transparent chips.

The transparent chips are made of the composite for the artificial marble containing 100 parts by weight of a base resin syrup, such as acrylic resin, 0.1~10 parts by weight of a crosslink agent, and 0.1~10 parts by weight of a polymerization initiator.

Acrylic resin, unsaturated polyester resin, epoxy resin, polyvinyl chloride (PVC), polystyrene (PS), polycarbonate (PC), polyethylene terephthalate (PET), or styrene-methylmethacrylate (SMMA) copolymer resin is used as the base resin. The base resin syrup is made of a resin monomer and/or a resin polymer. Generally, the base resin syrup is made of a mixture of the monomer and the polymer.

Preferably, an acrylic monomer is used as the monomer of the base resin, which can be polymerized. More specifically, the acrylic resin syrup is made of one methacrylate monomer or a mixture of two or more methacrylate monomers selected from the group consisting of methylmethacrylate (MMA), ethylmethacrylate (EMA), butylmethacrylate (BMA), 2-ethyl hexylmethacrylate (EHMA), benzyl methacrylate, and glycidyl methacrylate (GMA). Further, the acrylic resin syrup is made of a mixture of one methacrylate monomer and its partial polymer. Preferably, the acrylic resin syrup is made of a mixture of MMA and poly MMA. Further, preferably, the amount of the polymer in the acrylic resin syrup is 10~50% by weight.

The crosslink agent of the composite for the artificial marble of the present invention is one multifunctional acrylic monomer or a mixture of two or more monomers selected from ethylene glycol dimethacrylate (EDMA), diethylene glycol dimethacrylate (2EDMA), tri-ethylene glycol dimethacrylate (3EDMA), tetra-ethylene glycol dimethacrylate (4EDMA), trimethylolpropane trimethacrylate (TMPMA), 1,6-hexanediol dimethacrylate, polybutylene glycol dimethacrylate, and neopentylglycol dimethacrylate. Preferably, the crosslink agent is made of EDMA. The multifunctional acrylic monomer includes double links, for copolymerization in molecules, thus forms crosslinks with the acrylic resin syrup.

When the crosslink agent is not used or an excessively small amount of the crosslink agent is used, a bonding capacity among raw materials of the artificial marble is lowered, thus causing the irregular surface of the artificial marble and forming air bubbles in upper and lower portions of the artificial marble. Further, heat resistance and metachrosis of the artificial marble are deteriorated. On the other hand, when an excessively large amount of the crosslink agent is used, phase separation of the chips occurs, thus causing many problems regarding the pattern of the artificial marble. Accordingly, preferably, the amount of the crosslink agent used is 0.1~10 parts by weight per 100 parts by weight of the resin syrup.

The polymerization initiator of the composite of the artificial marble of the present invention serves to polymerize and harden the resin syrup, and is made of one or a mixture of two or more selected from the group consisting of organic peroxides including diacyl peroxides, such as benzoyl peroxide and dicumyl peroxide, hydroperoxides, such as butyl hydroperoxide and cumyl hydroperoxide, t-butyl peroxy maleic acid, t-butyl hydroperoxide, t-butyl hydroperoxy butylate, acetyl peroxide, lauroyl peroxide, azo-bis-isobutyro nitrile, azo-bis-dimetylvalero nitrile, t-butyl peroxyneodecanoate, and t-amylperoxy-2-ethylhexanoate. Further, the resin syrup may be polymerized and hardened at the room temperature using a mixture of peroxide of amine and sulfuric acid or a mixture of peroxide and cobalt compound.

Preferably, the amount of the polymerization initiator used is 0.1~10 parts by weight per 100 parts by weight of the resin syrup. Generally, the polymerization initiator is used together with a polymerization accelerator. When the amount of the polymerization initiator used is excessively small, the hardening speed of the composite for the artificial marble is slow and the composite for the artificial marble cannot be sufficiently hardened. On the other hand, when the amount of the polymerization initiator used is excessively large, the hardening of the composite for the artificial marble is delayed and the composite for the artificial marble is partially not hardened.

Further, a chain carrier (radical carrier) serving to adjust a molecular weight may be used. The radical carrier is one mercaptan compound selected from the group consisting of n-dodecyl mercaptan, t-dodecyl mercaptan, benzyl mercaptan, and trimethyl benzyl mercaptan. Preferably, the amount of the radical carrier is 0.1~5 parts by weight per 100 parts by weight of the resin syrup. When the amount of the radical carrier is excessively small, the effect of the radical carrier is not achieved, and when the amount of the radical carrier is excessively large, the hardening speed of the composite for the artificial marble is remarkably reduced and thus the composite for the artificial marble cannot be completely hardened.

The composite for the artificial marble may further contain at least one additional agent selected from the group consisting of an antifoaming agent made of silicon or non-silicon, a coupling agent made of a silane containing trimethoxy silane as a main component, acid, or titanate, an organic or inorganic pigment or dye, an ultraviolet absorbing agent made of phenyl salicylate, benzophenone, benzotriazole, nickel derivates, or radical scavengers, a fire retardant made of halogen, phosphor, or inorganic metal, a releasing agent made of stearic acid or silicon, a polymerization inhibitor made of catechol or hydroquinone, a thixotropy agent made of fine silica, and an antioxidant made of phenol, amine, quinine, sulfur, or phosphor.

The above composite for the artificial marble is supplied to a batch feeder and is dispersed by an impeller, and the mixed raw material slurry is discharged and supplied to a steel belt to a designated thickness, thereby being cast into a flat plate for preparing transparent chips. Then, the flat plate is hardened.

Preferably, the flat plate is formed by continuous casting. That is, the raw material slurry, which is discharged from a nozzle of an outlet of the batch feeder, is supplied to the movable steel belt, moves by the driving of the belt, and is hardened.

The hardened plate is put into a crusher. Then, the crusher crushes the plate into transparent chips having a designated size. A conventional mill (hammer mill or a crusher mill) for crushing stone is used as the crusher. Preferably, the transparent chips have particle sizes of 2~6 mm.

When the sizes of the transparent chips are larger than 6 mm, layer separation generated due to the floatation of the transparent chips becomes severe, a compound layer serving as a product surface is remarkably formed. It causes non-uniform specific gravity of the quartz chips. The transparent chips having various sizes are prepared, and are properly mixed according to the sizes when the quartz chips are prepared. When only the transparent chips having small sizes are used, the thickness of a cast plate is small due to severe floatation of the transparent chips so that the productivity of the plate is lowered, and when only the transparent chips having large sizes are used, intervals between the transparent chips are increased so that the quartz chips do not contain any transparent portion or contain only the transparent portions.

Thereafter, the transparent chips are mixed with a composite for the artificial marble containing an inorganic filler, and the mixture is cast into a flat plate. Then, the flat plate is hardened. The flat plate is crushed into quartz chips including the transparent chips.

The quartz chips are made of the mixture of 50~200 parts by weight of the transparent chips with 100 parts by weight of the composite for the artificial marble, which contains 100 parts by weight of a base resin syrup, 300~500 parts by weight of an inorganic filler, 0.1~10 parts by weight of a crosslink agent, 0.1~10 parts by weight of a polymerization initiator, and 0.5~3 parts by weight of a thixotropy agent.

The inorganic filler of the composite for the artificial marble is an inorganic powder, which is made of one or a mixture of two or more selected from the group consisting of aluminum hydroxide, magnesium hydroxide, calcium aluminate, calcium carbonate, silica, and alumina.

Preferably, the inorganic filler has a particle size of 5~200 μm. When the particle size of the inorganic filler is excessively small, the light transmissivity of the artificial marble is decreased, and when the particle size of the inorganic filler is excessively large, the physical properties of the artificial marble are deteriorated.

Preferably, in order to improve dispersability with the resin and the mechanical strength of the product and to prevent precipitation of solid matter, the surface of the plate is treated by a coupling agent made of silane or titanate, or stearic acid. Further, preferably, the amount of the inorganic filler is 300~500 parts by weight per 100 parts by weight of the base resin syrup.

The process for preparing the quartz chips are the same as the above-described process for preparing the transparent chips.

Preferably, the sizes of the quartz chips are 0.1~10 mm. When the sizes of the quartz chips are larger than 10 mm, the excessively large-sized quartz chips cannot be easily used. Since the product of the artificial marble is a flat plate having a thickness of approximately 14 mm, the above large-sized quartz chips cannot be used in the artificial marble, cause cracks at a portion of the artificial marble between the chip and a base, and are jammed into the impeller of the batch feeder. Further, the excessively large-sized quartz chips affect the flowability of the raw material. Even when the sizes of the quartz chips are less than 10 m, the smaller the sizes the quartz chips have, the more usefully the quartz chips are used. However, the large quartz chips are useful to express the pattern of the product of the artificial marble. Accordingly, preferably, the quartz chips having various sizes are prepared, and are properly mixed according to the sizes when the artificial marble is prepared.

Thereafter, the artificial marble using the quartz chips is prepared.

The artificial marble is made of a mixture of 2~40 parts by weight of the quartz chips with 100 parts by weight of a raw material composite, which contains 100 parts by weight of a base resin syrup, 50~250 parts by weight of an inorganic filler, 0.1~10 parts by weight of a crosslink agent, and 0.1~10 parts by weight of a polymerization initiator, and.

The quartz chips including the transparent chips are mixed with the composite for the artificial marble, the mixture is cast into a flat plate having a designated thickness using a mold or a steel belt for continuous casting, and the flat plate is hardened. Then, in order to smooth and gloss the surface of the flat plate, the surface of the flat plate is polished with sandpaper or by other methods, thereby preparing the artificial marble of the present invention.

Figure 2:
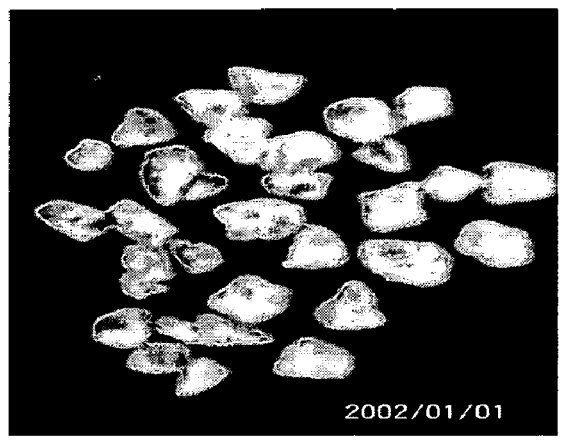
FIG. 2 is a photograph of quartz chips obtained by crushing the flat plates of FIG. 1.

FIG. 1 is a photograph illustrating side surfaces of intermediate products (flat plates for preparing quartz chips) using transparent chips in accordance with the present invention. The flat plates are prepared using acrylic transparent chips, which do not contain an inorganic filler and thus maintain transparency. FIG. 2 is a photograph of articles (quartz chips) obtained by crushing the flat plates of FIG. 1. In FIGS. 1 and 2, dark portions represent the transparent chips.

Figure 3:
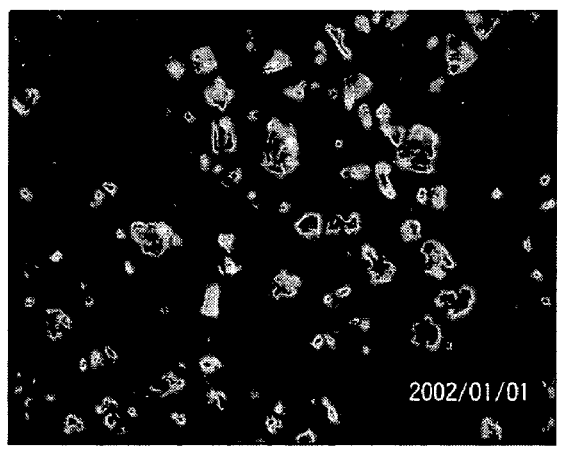
FIG. 3 is a photograph of an artificial marble in accordance with the present invention.

FIG. 3 is a photograph of an artificial marble in accordance with the present invention. The artificial marble, to which the quartz chips obtained by crushing the flat plates of FIG. 1 are applied, has transparency similar to natural quartz. The density of the exposed surfaces of the transparent chips is adjustable.

INDUSTRIAL APPLICABILITY

The present invention provides an artificial marble, transparency of which is more than 95% using acrylic transparent chips through uniformization of specific gravities, and a process for preparing the same, thereby exhibiting a quartz effect, which was not expressed by a conventional artificial marble using chips containing an inorganic filler.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An artificial marble comprising transparent chips for exhibiting a quartz effect, wherein the size of the transparent chips is in a range of 2~6 mm; wherein the transparent chips comprise a base resin syrup, a crosslink agent, and a polymerization initiator, and includes no inorganic filler; and wherein the artificial marble further comprises artificial quartz chips, wherein the transparent chips are embedded in the artificial quartz chips and uniformly dispersed in a semi-transparent or opaque region serving as a base of the artificial quartz chips.

2. The artificial marble according to claim 1, wherein the specific gravity of the artificial quartz chips is 1.4~1.8.

3. The artificial marble according to claim 1, wherein the specific gravity of the artificial quartz chips is equal to that of a raw material composite for the artificial marble, or differs from that of the raw material composite for the artificial marble by ±0.2 or less.

4. The artificial marble according to claim 1, wherein the light transmissivity of the transparent chips is 90% or higher.

5. The artificial marble according to claim 1, wherein 2~40 parts by weight of the artificial quartz chips are contained per 100 parts by weight of a raw material composite for the artificial marble, which contains 100 parts by weight of a base resin syrup, 50~250 parts by weight of an inorganic filler, 0.1~10 parts by weight of a crosslink agent, and 0.1~10 parts by weight of a polymerization initiator.

6. The artificial marble according to claim 1, wherein the artificial quartz chips contain 50~200 parts by weight of the transparent chips per 100 parts by weight of a raw material composite for the artificial quartz chips, which contains 100 parts by weight of a base resin syrup, 300~500 parts by weight of an inorganic filler, 0.1~10 parts by weight of a crosslink agent, 0.1~10 parts by weight of a polymerization initiator, and 0.5~3 parts by weight of a thixotropy agent.

7. The artificial marble according to claim 1, wherein the transparent chips comprise 100 parts by weight of the base resin syrup, 0.1~10 parts by weight of the crosslink agent, and 0.1~10 parts by weight of the polymerization initiator.

8. The artificial marble according to claim 1, wherein the sizes of the artificial quartz chips are in a range of 0.1~10 mm.

9. A process for preparing an artificial marble comprising:
preparing transparent chips by forming a first flat plate using a first composite for the artificial marble, which does not contain an inorganic filler, hardening the first flat plate, and crushing the hardened first flat plate;
preparing quartz chips by forming a second flat plate by mixing the transparent chips with a second composite for the artificial marble, which contains an inorganic filler, hardening the second flat plate, and crushing the hardened second flat plate; and
mixing the quartz chips with a raw material composite for the artificial marble.

10. The process according to claim 9, wherein the specific gravity of the quartz chips becomes equal to or close to the specific gravity of the raw material composite for the artificial marble by adjusting the specific gravity and the amount of the inorganic filler of the quartz chips.

11. The process according to claim 9, wherein the second flat plate used in the preparation of the quartz chips has a thickness equal to the maximum diameter of the transparent chips.

* * * * *